June 3, 1930.  H. SCHLAICH  1,761,751
INDICATING DEVICE
Filed April 6, 1928   2 Sheets-Sheet 1

Inventor
Herman Schlaich
By Attorneys
Moser & Koch

June 3, 1930.  H. SCHLAICH  1,761,751
INDICATING DEVICE
Filed April 6, 1928  2 Sheets-Sheet 2
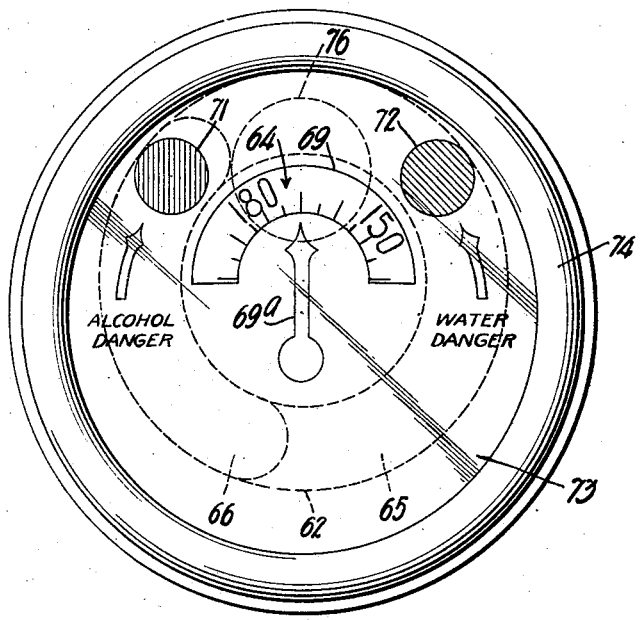
Fig. 5.
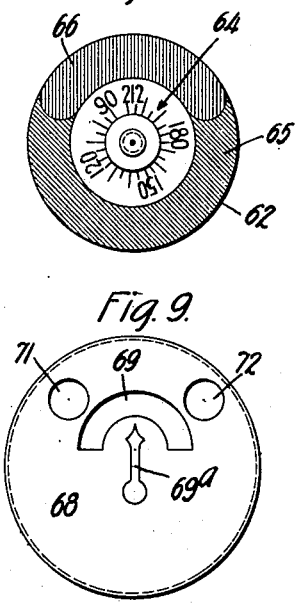
Fig. 8.
Fig. 9.
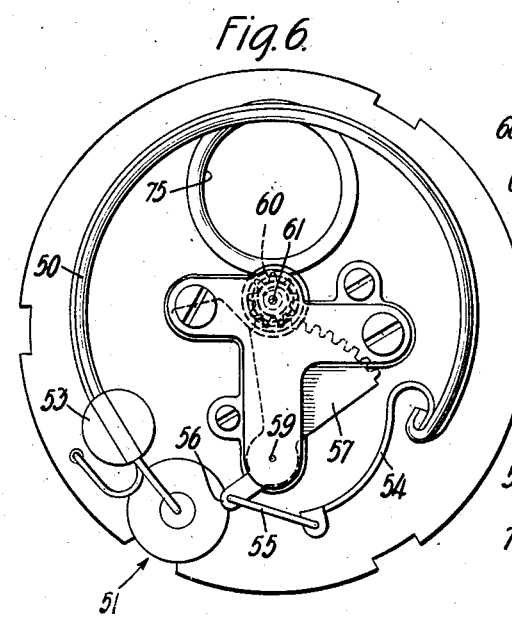
Fig. 6.
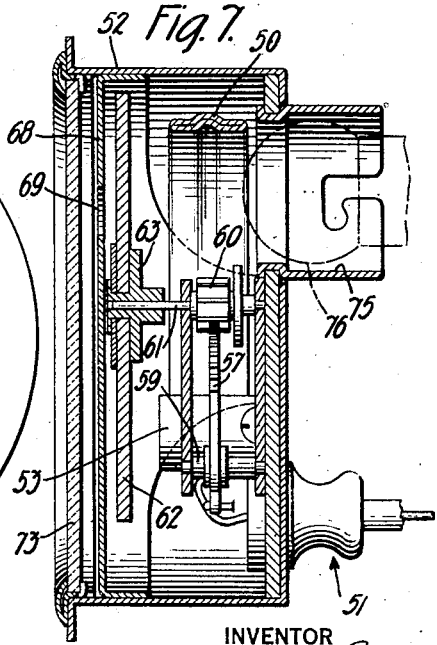
Fig. 7.
INVENTOR
Herman Schlaich
BY
ATTORNEYS Patented June 3, 1930

1,761,751

UNITED STATES PATENT OFFICE

HERMAN SCHLAICH, OF ELMHURST, NEW YORK

INDICATING DEVICE

Application filed April 6, 1928. Serial No. 267,842.

The present invention relates to indicators which although susceptible to other uses, find particular application to thermometers of the distance type. The invention will be best understood by reference to the following detailed description taken with the annexed drawings in which, Figure 1 is an enlarged view of an illustrative embodiment;

Figure 5 is a view of a second embodiment;

Figure 6 is a view of the instrument with dial and indicator removed, and showing the actuating mechanism of the gauge;

Figure 7 is a view in central vertical section;

Figure 8 is a view on a reduced scale of the indicating element, and,

Figure 9 is a view also on a reduced scale of the dial plate.

Both of the described embodiments are characterized by the provision in the instrument for an auxiliary indication which will be visible for certain positions of the main indicator. Preferably, and as shown, the auxiliary indicator in both embodiments, is continuously actuated, whereby the actuation of such indicator in no way effects the accuracy of the main indicator. In the embodiment first described, the slight additional work required for the actuation of the auxiliary indicator is uniformly distributed over the entire operating range of the main indicator. In the second described embodiment, this idea is further carried out so as to include a construction in which the auxiliary indicator forms a part of the main indicator. Both embodiments described are particularly designed for indicating temperatures of automobile internal combustion engines and preferably both provide for a "danger" indication, not only at the boiling point of water, but also of alcohol.

Figure 3:
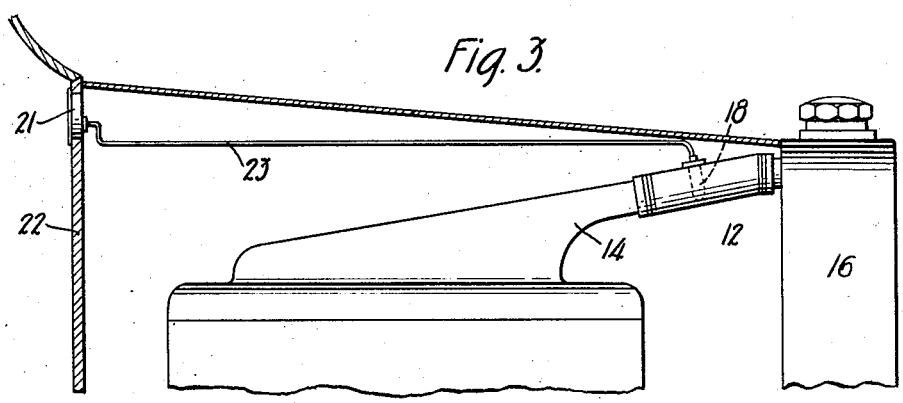
Figure 3 is a diagrammatic view showing the illustrative device as applied to the cooling system of an internal combustion engine.

Referring to the drawings by characters of reference, 10 denotes the dial of the instrument which in the embodiments shown in all the figures is a thermometer of the distance type adapted to indicate the temperature of the cooling system of an automobile, the installation of the device being apparent from Figure 3. In said figure, 12 is the usual hose connection between the cylindrical jacket outlet 14 and the radiator 16. 18 is a bulb containing a suitable fluid whose expansion or contraction is utilized to operate the usual Bourdon tube 20 of the indicating instrument denoted generally by 21 mounted on the dash 22, bulb 18 being joined thereto by means of a sheathed capillary tube 23 of known type. Movement of the free end of the Bourdon coil is transmitted to a pointer 24 through its arbor 26 attached to said free end, the other end of said coil being anchored to the casing 27 of the instrument. A compensating spring 28 is also attached to said arbor 26. The instrument is preferably provided with the usual cover glass 29.

Figure 1:
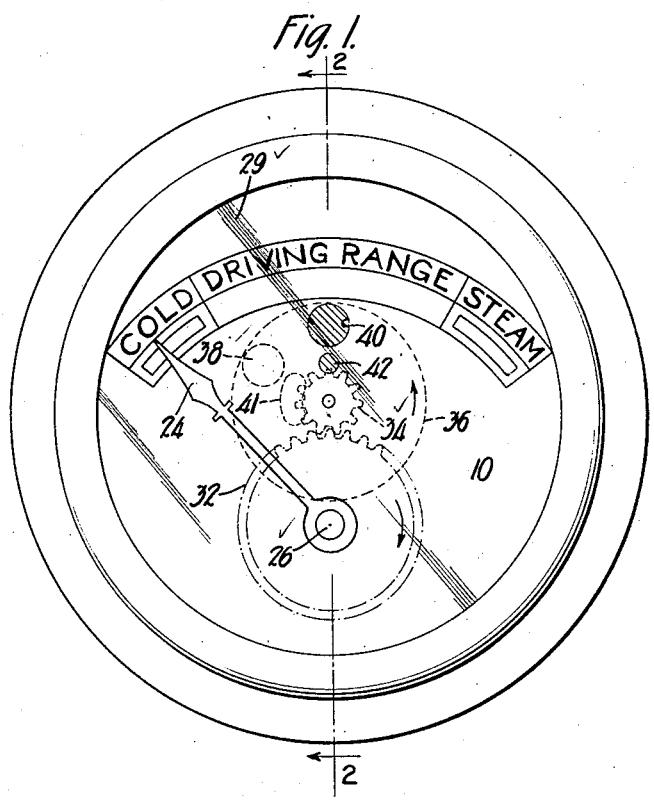
Figure 2:
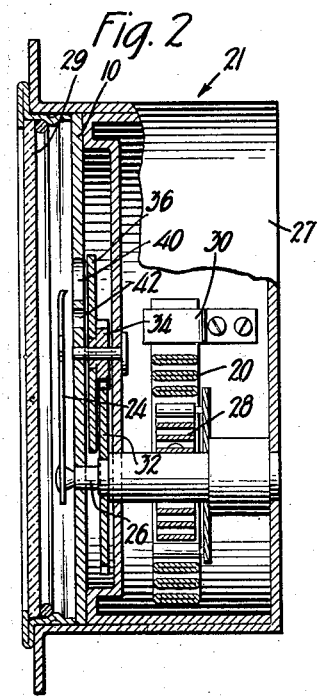
Figure 2 is a view taken in section along the line 2—2 of Figure 1.
Figure 4:
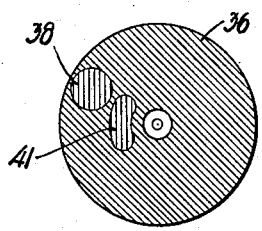
Figure 4 is a detail of the auxiliary indicating element, the straight lines being used to indicate contrasting colors.

The device as described thus far is standard in the art and the application of the present invention to such an instrument may now be given. Referring to Figures 1 and 2, mounted on the arbor 26 is a gear 32 which meshes with a pinion 34 attached to an auxiliary indicator 36 which latter is conveniently in the form of a disk shown best in Figure 4. The major portion of disc 36 is preferably of one color, as for example, green, whereas a small, preferably circumferential portion or spot 38 is of different color, preferably red, the parts being arranged so that the red spot will register with a sight opening 40 in dial 10 at a desired interval of the travel of the pointer 24; for example, when the latter indicates "steam" on the dial. As above stated, it is also a feature of the invention to indicate a similar condition obtaining when alcohol is used in the radiator of the automobile and for this purpose spot 41 is also provided on dial 36, such spot conveniently being of circumferentially elongated shape and disposed so that it will be visible in a second sight opening 42 at the proper time, prior to the indication given by spot 38. Due to its elongated shape, the indication will continue through the alcohol-water boiling point range.

In the embodiment described in the foregoing it will be seen that in addition to the regular dial pointer for indicating motor temperature, I provide an auxiliary indicator or signal which will indicate to the operator a safe condition at all times except when the pointer is indicating an overheated condition of the motor, whereupon the signal changes to red, and in this additional and more striking manner draws the attention of the operator to such condition of the motor.

Referring to Figure 5, an instrument having a somewhat similar actuating mechanism is provided, the same consisting of a Bourdon coil 50 which has an inlet connection 51 in the back of a casing 52. Bourdon coil 50 is anchored at 53, the free end thereof being connected to a compensating spring 54 which in turn is connected by means of a link 55 to an arm 56 of a segment 57. Segment 57 is pivoted at 59 and its teeth engage a pinion 60 on an arbor 61, said arbor carrying an indicator disc 62, the latter being secured to said arbor by means of a hub 63. As shown best in Figure 8, disc 62 carries a circular temperature scale 64, and at or near the periphery thereof an annular band 65, and a band 66 comprising preferably the remainder of the circumference, band 66 preferably being colored red, and the band 65 green. In front of the disc 62 is a dial 68 having an arc-shaped opening 69 (through which the scale 64 is visible) a stationary pointer 69ª, and a pair of sight holes 71, 72, respectively, preferably disposed somewhat in the manner as shown in the Figures 5 and 9. It will be understood that the arrangement of the bands 65, 66 with reference to the scale 64 and pointer 69ª is such that the red band 66 is visible in the left hand sight opening 71 when the boiling point of alcohol is reached, and said band will be visible through opening 72 when the boiling point of water is reached, such boiling points being indicated on the scale 64 with reference to the stationary pointer 69ª. Due to the length of the band 66, it will be seen that once the alcohol indication is given, the same will be continued to that of the boiling point of water at times other than those when the red color is showing, the green will be showing indicating safety.

As will be evident from Figures 5, 6, and 7, a glass covering 73 is provided for the front of the instrument, and is held therein by means of a bezel 74. Dial 62 is preferably of translucent material whereby the instrument may be illuminated from the rear, and for such purpose a mounting 75 is provided for an electric light bulb 76.

From the foregoing it will be seen that instruments of great simplicity and practicability have been provided for the purpose stated. It will be particularly noted that in the embodiment last described, movement of a single indicating member, indicates not only the temperature (or other value) to be measured, but provides a warning signal at a plurality of places in the indicating range. While described with reference to instruments which indicate temperatures, it will be understood that the invention is equally applicable to devices for indicating any one of a number of quantities.

It will be further understood that various changes may be made in the form and construction of the specific embodiment above described in detail without departing from the spirit of my invention and the scope of the appended claims.

What I claim is:

1. In a temperature-indicating device adapted to give motor temperatures, a main indicator giving values over the operating range of the instrument, means for actuating same in response to variation in motor temperatures, and an auxiliary indicator actuated through said main indicator giving a warning signal at substantially the boiling point of alcohol and a warning signal for that of water.

2. In an indicating device, an indicator proper, an auxiliary indicator or signal member separate from, and continuously actuated by, movement of said indicator first mentioned, said auxiliary indicator giving a continuous indication either of safe or dangerous condition, as determined by said indicator first mentioned.

3. In an indicating device, a dial having a sight opening therein, an indicator proper, an auxiliary indicator behind said dial and bearing different indicia, said auxiliary indicator being separate from and continuously actuated by said indicator first mentioned, the parts being constructed and arranged so that a different indication as seen through said sight opening is given by said auxiliary indicator for safe and for dangerous operation as determined by said indicator first mentioned.

4. In an indicating device, a dial having a sight opening therein, an indicator proper, an auxiliary indicator behind said dial bearing different indicia visible through said sight opening, and gearing for continuously driving said auxiliary indicator from said indicator first mentioned.

5. In an indicating device adapted to give motor temperatures, a dial, a main indicator cooperating therewith, an auxiliary indicator separate from said main indicator, means for continuously driving same by said main indicator, said auxiliary indicator having an indicium representing the boiling point of water and an indicium representing that of a cooling medium other than water and said dial having separate means for viewing said indicia.

6. In an indicating device adapted to give motor temperatures, a dial, a main indicator cooperating therewith, an auxiliary indicator separate from and continuously actuated through said main indicator, means for actuating same in response to variation in motor temperatures, said dial having a pair of sight openings for viewing said auxiliary indicator, said auxiliary indicator being arranged so as to exhibit through said openings danger conditions corresponding to the boiling points of alcohol and of water respectively when the temperatures represented by such boiling points are reached.

7. In an indicating device adapted to give motor temperatures, a dial, a main indicator cooperating therewith, an auxiliary indicator, means for continuously driving said auxiliary indicator with said main indicator said auxiliary indicator being in the form of a disc having a uniform color except for a pair of spots of a different color, said dial having separate sight openings for viewing the path of travel of said spots, the latter being arranged so as to be exhibited when the boiling point of alcohol and that of water are respectively reached.

8. In a temperature indicating device adapted to give motor temperatures, a main indicator giving values over the operating range of the instrument, means for actuating same in response to variations in motor temperatures and auxiliary indicating means giving a warning signal at substantially the boiling points of two different cooling media.

9. In an indicating device adapted to give motor temperatures, a dial, a main indicator cooperating therewith, an auxiliary indicator, means for actuating said indicators in response to variations in motor temperatures, said dial having a pair of sight openings for viewing said auxiliary indicator, said auxiliary indictor being arranged to be exhibited through said openings when the boiling point of water and that of a cooling medium other than water are respectively reached.

In testimony whereof I have affixed my signature to this specification.

HERMAN SCHLAICH.